July 20, 1948.  E. W. PLUMB  2,445,634
QUICK CHANGE LATHE TOOL HOLDER
Filed June 21, 1946  4 Sheets-Sheet 1
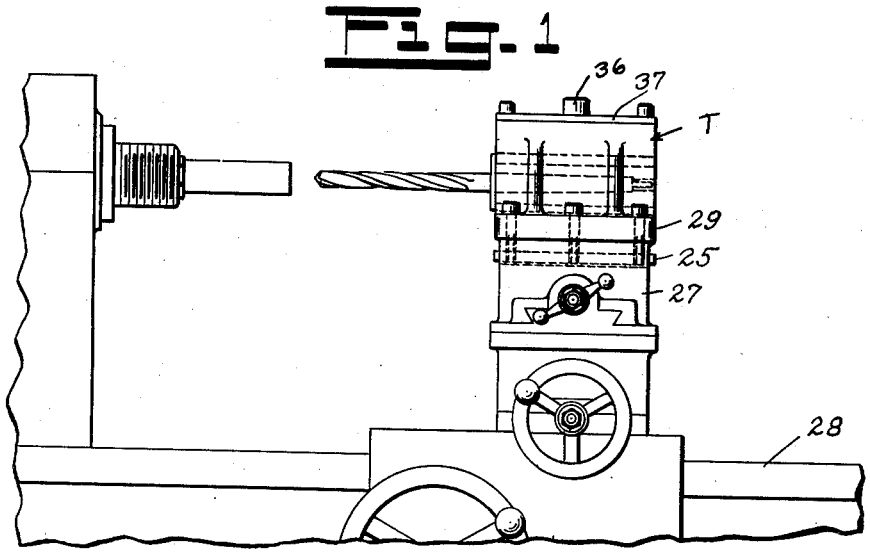
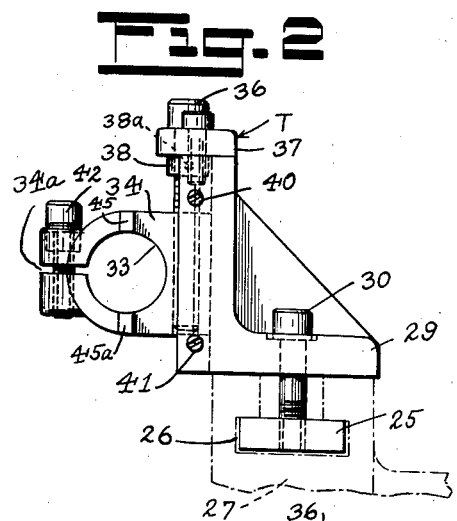
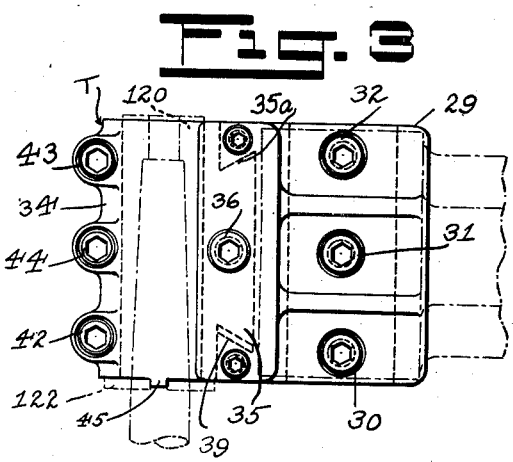
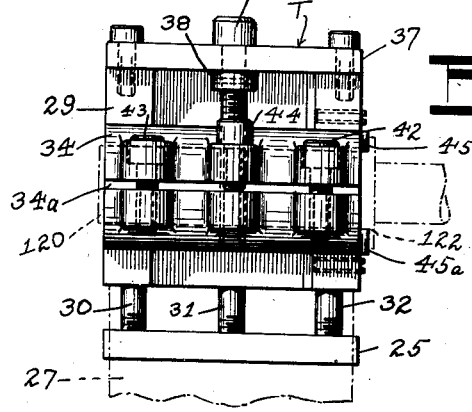
INVENTOR
EDWIN W. PLUMB
BY H. G. Manning
ATTORNEY July 20, 1948.                    E. W. PLUMB                    2,445,634
                         QUICK CHANGE LATHE TOOL HOLDER
Filed June 21, 1946                                        4 Sheets-Sheet 2
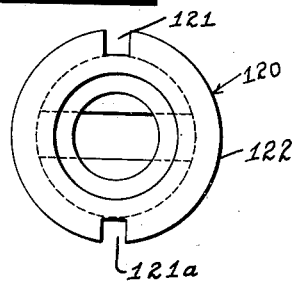
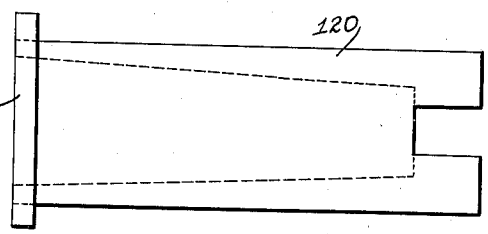
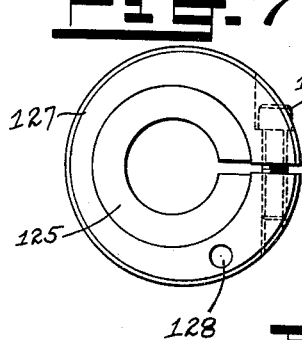
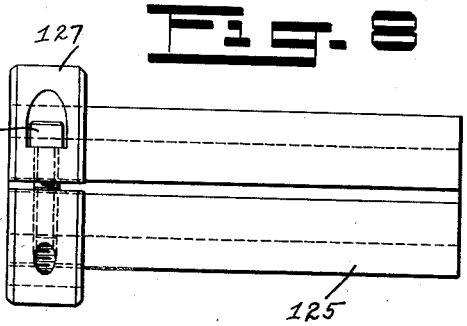
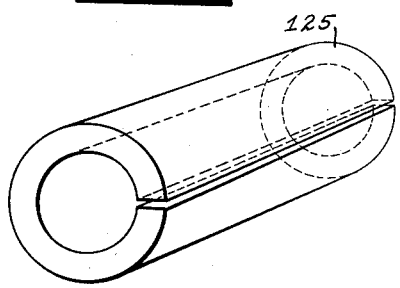
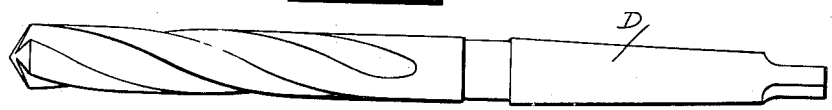
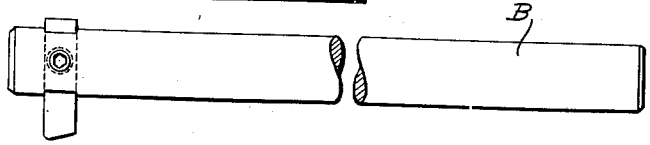
INVENTOR
EDWIN W. PLUMB
BY H. G. Manning
ATTORNEY July 20, 1948.  E. W. PLUMB  2,445,634
QUICK CHANGE LATHE TOOL HOLDER
Filed June 21, 1946  4 Sheets-Sheet 3
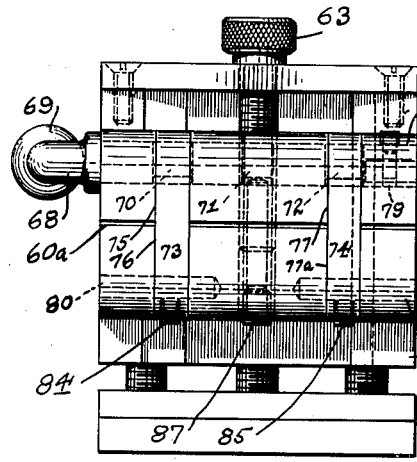
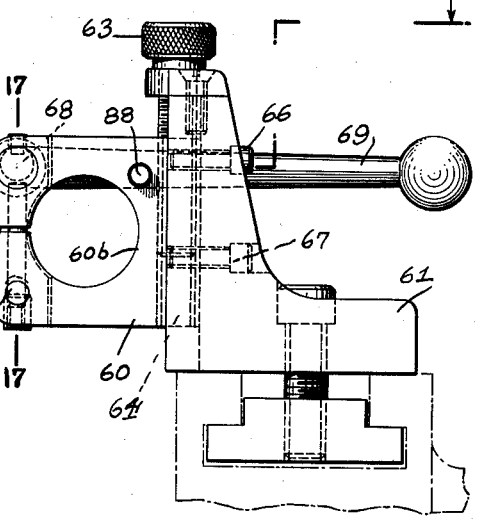
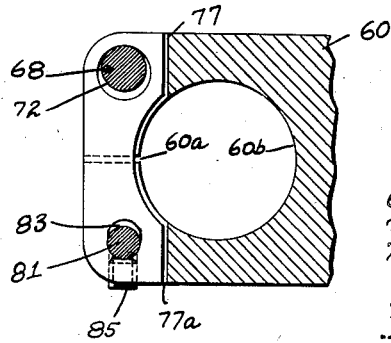
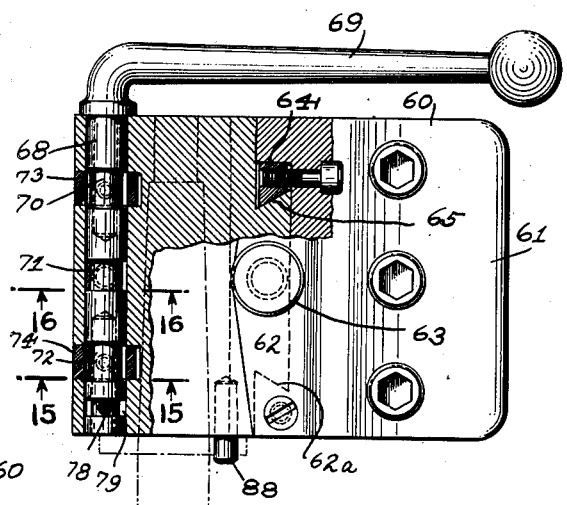
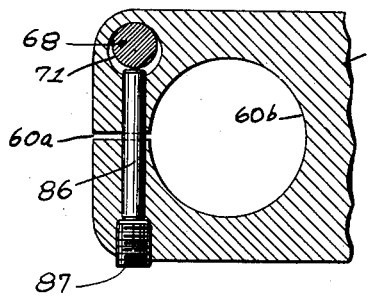
INVENTOR
EDWIN W. PLUMB
BY
H. G. Manning
ATTORNEY

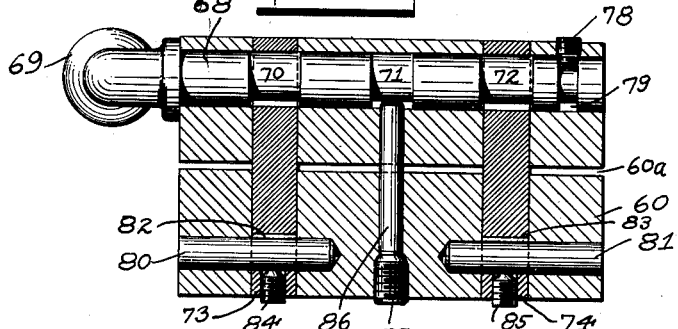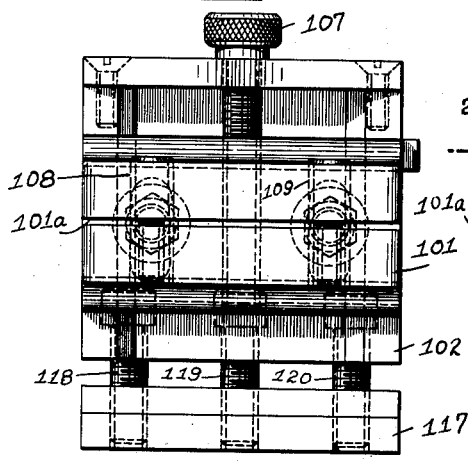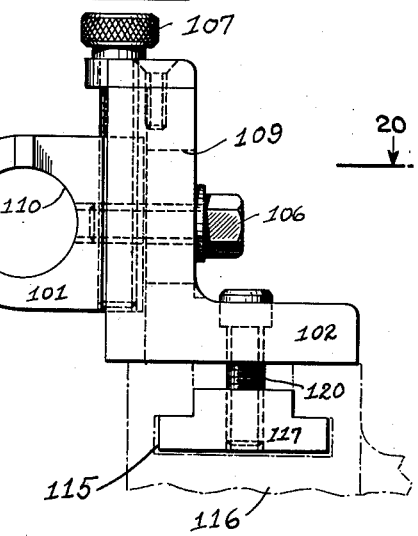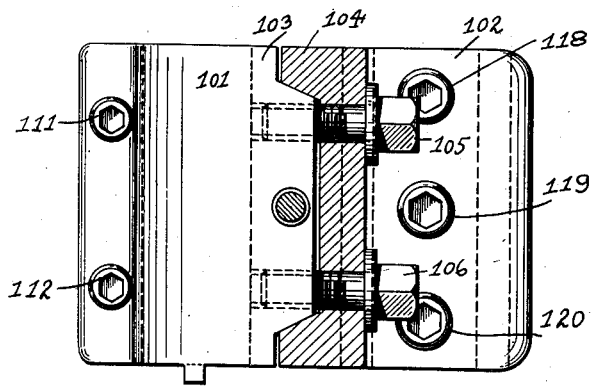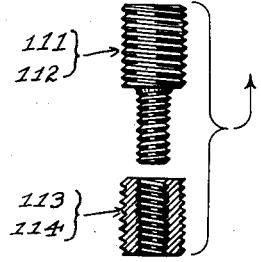

Patented July 20, 1948

2,445,634

UNITED STATES PATENT OFFICE 2,445,634

QUICK-CHANGE LATHE TOOLHOLDER

Edwin W. Plumb, Morris, Conn.

Application June 21, 1946, Serial No. 678,475

3 Claims. (Cl. 82—36)

This invention relates to lathe tool holders, and more particularly to a quick change tool holder used for chucking operations in engine lathes.

One object of the present invention is to provide a device of the above nature which will be capable of interchangeably holding offset single pointed tools which must be adjusted laterally for boring, turning, facing, or cutting off operations, as well as tools such as drills and reamers which must operate in line with the axis of the lathe.

A further object of the present invention is to provide a tool holder of the above nature having means for aligning the tools vertically with respect to the axis of the lathe.

A still further object is to provide a device of the above nature having means for changing tools rapidly and conveniently, and for returning them accurately to the same position in the holder for repetitive operations.

A further object is to provide means attachable to each individual tool or adaptor to permit rotative adjustment of said tool in the holder without changing the adjustment of the holder itself.

A further object is to provide a tool holder of the above nature which will be simple in construction, inexpensive to manufacture, easy to install and manipulate, rugged in construction, compact, ornamental in appearance, and very efficient and durable in use.

With these and other objects in view, there have been illustrated on the accompanying drawings three forms in which the invention may conveniently be embodied in practice.

In the drawings,

Fig. 1 represents a fragmentatry side view in elevation of a lathe upon which the first form of tool holder embodying the present invention has been installed.

Fig. 2 is an end view of the first form of tool holder as it appears when attached to the lathe compound rest shown in dotted lines.

Fig. 3 is a top plan view of the same, showing the tool in dotted lines.

Fig. 4 is a rear view of the same.

Fig. 5 is an end view of an adaptor member for receiving a tapered shank tool, prior to clamping it in the tool holder.

Fig. 6 is a side view of the same.

Fig. 7 is an end view of a split bushing for receiving a cylindrical shank tool prior to inserting it in the tool holder.

Fig. 8 is a side view of the same.

Fig. 9 is a perspective view of the same, with the adjusting collar removed.

Fig. 10 is a side view of a drill which is adapted to be clamped within the adaptor shown in Figs. 5 and 6.

Fig. 11 is a side view of a boring bar for use with the split bushing shown in Figs. 7-9.

Fig. 12 is a front view in elevation of a second form of tool holder having a quick-acting tool clamping and releasing device.

Fig. 13 is an end view of the same, showing how the tool holder is attached to the compound tool rest of a lathe.

Fig. 14 is a sectional view of the same, taken along the broken line 14—14 of Fig. 13, looking downwardly.

Fig. 15 is a fragmentary sectional view of the same, taken along the line 15—15 of Fig. 14.

Fig. 16 is a fragmentary sectional view of the same, taken along the line 16—16 of Fig. 14, looking upwardly.

Fig. 17 is a vertical sectional view of the same, taken along the line 17—17 of Fig. 13.

Fig. 18 is a front view in elevation of a third form of tool holder embodying the invention.

Fig. 19 is an end view of the same, showing in dotted lines the compound tool rest.

Fig. 20 is a sectional view of the same, taken along the broken line 20—20 of Fig. 19, looking downwardly.

Fig. 21 is a side view, in separated relation, of the compound screw and bushing employed with the third form of tool holder.

At present, engine lathe work involving repetitive operations on parts held in the lathe chuck, is apt to be a comparatively slow and clumsy process due to the difficulty in changing tools. Each tool change involves resetting the tool for center height and reestablishing its position relative to the cross slide. In drilling and reaming operations, the tools are held in the tailstock and fed laboriously by hand.

Numerous devices, such as cross slide turrets and tailstock turrets have been provided to speed up chucking operations in engine lathes, and work very well on certain classes of work. However, devices of this nature are not well adapted for holding both offset outside turning tools, and drills, reamers, and similar tools.

The present invention is intended to provide a tool holder capable of permitting unlimited tool changes and which will be well adapted to hold either drills or offset turning and facing tools.

An operator using this improved tool holder will be provided with a number of tool adaptors having standardized shanks to fit the split tool block and holding various tools for successive operations on the work. In the case of drills and boring bars, adaptors or bushings may be used which fit over the shanks thereof to adapt them to fit in the hole in the tool block. Since the holder is designed to clamp and release these adaptors and bushings quickly and permit them to be returned to the same relative positions when reinserted, the operator is enabled to perform successive operations with a minimum amount of time wasted in tool changes.

Referring now to the drawings in which like reference numerals denote corresponding parts throughout the several views, and more particularly to the first form of the invention, shown in Figs. 1–4, the numeral 25 indicates a rectangular clamping bar which is adapted to be inserted in a T-slot 26 of a compound rest 27 of a lathe 28.

The first form of tool holder, which is indicated generally by the numeral T is provided with a base member 29, which is adapted to be clamped in operating position by means of three headed vertical clamp screws 30, 31, 32, engaging the bar 25.

In order to hold a tool adaptor or bushing (Figs. 5–9) in operating position, provision is made of a split block 34 having a horizontal hole 33 provided with an outer slot 34a, which block 34 may be adjusted parallel to the axis of the lathe by means (not shown) responsive to the angular adjustment means of the compound rest.

The split block 34 is attached to the base member 29 by means of a dove-tailed tongue 35 which may be adjusted vertically in a dovetail groove 35a in the base 29 by means of a central elevating screw 36 to bring the center of said block into alignment with the axis of the lathe.

The tool block 34 is adapted to be locked in vertically adjusted position by means of a vertical gib 39 which may be forced against the dovetailed tongue 35 by means of a pair of set screws 40, 41.

Provision is also made on the base 29 of a narrow top plate 37 for supporting the elevating screw 36 and covering the base member 29. A collar 38 under the top plate 37 is secured to the screw 36 by a pin 38a in order to hold said screw against accidental vertical movement (Fig. 2).

The adaptors and bushings (Figs. 5–9) for the tools operating on the work in the lathe will be provided with cylindrical shanks which may be inserted into the cylindrical recess 33 of the split tool block 34, and clamped securely therein by tightening a pair of cap screws 42, 43 which contract the sides of the split tool block 34 sufficiently to produce the desired clamping action.

A central releasing screw 44 is located between the screws 42, 43, being threaded into the top portion of the split tool block 34, and bears against the bottom portion of said block, so that after said cap screws 42, 43 are loosened, the screw 44 may be rotated to expand the tool block sufficiently to permit removal of the tool therefrom.

In order to hold the tool against turning under the cutting action of the lathe tools, provision is made of a pair of vertically aligned keys 45, 45a, integral with the block 34 and adapted to engage in suitable keyways of the adaptors or bushings clamped in said block. These keys 45, 45a will insure that the tools will be returned to the tool holder in exactly the same radial position each time they are inserted therein.

Figs. 5 and 6 of the drawing illustrate a flanged adaptor 120 for holding taper shank drills, reamers, and other multiple edge cutting tools indicated by D (Fig. 10) in the tool holder T shown in Figs. 1–4. The body of the adaptor 120 is of such a diameter as to fit the cylindrical hole 33 in the tool block 34. The end flange of the adaptor 120 has a pair of opposed keyways 121, 121a, which are adapted to receive the vertically aligned keys 45, 45a, respectively, mentioned above.

The adaptor 120 also has an integral flange 122 which serves as a stop when the adaptor is inserted into the tool block 34.

In Figs. 7–9 a split bushing 125 is illustrated which serves to hold a cylindrical boring bar B, as shown in Fig. 11. The bushing 125 is adapted to be clamped upon the boring bar B (Fig. 11) after the bar has first been adjusted to the desired center height and longitudinal position in said bushing by a cap screw 126 mounted in a detachable split collar 127 provided with a guide hole 128 which is adapted to receive the side pin 88 on the tool block 60 shown in Figs. 12–17.

*Second form of the invention*

In the second form of the invention shown in Figs. 12–17 a modified form of hollow tool block 60 is slidably attached to a base clamping member 61 by means of a vertical dovetail tongue 62 which is adjustable in a dovetail groove 62a by a vertical elevating screw 63. The dovetail tongue 62 is clamped to the base member 61 by means of a clamping bar 64 of trapezoidal cross section.

The clamping bar 64 is adapted to be drawn into firm engagement with an angular surface 65 of the tool block 60 by means of a pair of horizontal clamping screws 66, 67.

In this form of the invention, the block 60 has an interior cylindrical recess 60b in which the tool adaptor or bushing is held by a quick-acting clamping device which allows it to be gripped or released rapidly and conveniently. The tool block 60 is split lengthwise to provide a slot 60a which permits the block 60 to be selectively contracted or expanded under the action of the device now to be described.

A horizontal cam shaft 68 provided with an integral handle arm 69 at right angles thereto extends through the tool block 60 in a longitudinal direction, and is rotatable therein. The shaft 68 is restrained against endwise motion by means of a shoulder screw 78 carried by the block 60 and located in a groove 79 in said shaft 68.

The shaft 68 is also provided with three eccentric cams 70, 71, 72—the end eccentrics 70, 72 passing through the upper ends of a pair of vertical parallel links 73, 74 which are adapted to be pulled upwardly by a partial turn of the handle 69 to contract the split block 60 slightly.

The end links 73, 74 are fitted into a pair of vertical open slots 75, 76, and 77, 77a formed in the front of the tool block 60, and said links are secured to the lower end of the tool block 60 by a pair of horizontal pins 80, 81 which pass through elongated slots 82, 83 in links 73, 74.

In order to adjust the clamping action of the links 73, 74 a pair of vertical set screws 84, 85 are threaded into the lower ends thereof and bear upon the pins 80, 81.

The central eccentric 71 engages a vertical plug 86 mounted in the block 60 in such a manner that said plug will be depressed when the handle 69 is rotated in the opposite direction, causing the split sections of the tool block 60 to be spread apart, enabling the tools to be easily removed from the cylindrical recess 60b. The plug 86 may be adjusted by a set screw 87 as desired.

Third form

In the third form of the invention shown in Figs. 18–21 a split tool block 101 is slidably mounted vertically on a base 102 by means of two cooperating angled ways 103, 104. The angular surfaces of said ways are clamped together by means of a pair of horizontal bolts 105, 106 and the vertical adjustment of the tool block may be varied by turning an elevating screw 107. The base 102 is provided with a pair of vertical slots 108, 109 to permit adjustment in the vertical positions of the clamp screws 105, 106.

The tool block 101 is split with a horizontal slot 101a to permit the clamping of tool adaptors in a cylindrical recess 110. The clamping action in this form of holder, however, is obtained by the use of a pair of compound screws 111, 112, both of which are provided with left hand threads on their upper larger ends, and with right hand threads on their lower smaller ends.

Provision is also made of a pair of bottom bushings 113, 114, which are threaded exteriorly to engage in tapped holes in the lower part of the split tool block 101, and tapped internally to engage the lower small right hand threaded sections of the screws 111, 112.

As in the first two forms of the invention, the tool holder base 102 is attached to the T-slot 115 of the compound rest 116 by means of a clamping bar 117 held in place by three vertical headed clamp screws 118, 119, 120.

In the assembly of the parts of the third form of the invention, the screws 111, 112 will be first inserted in the top section of the tool block 101. The bushings 113, 114 will then be inserted in operating position in the lower section of said tool block and twisted into engagement with the screws 111, 112.

One advantage of the present invention is that by reason of the great reduction in tool-changing time it will make possible rapid production on engine lathes, approaching that of turret lathes.

While there have been disclosed in this specification three forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a lathe tool holder, a base for attachment to the compound rest of the lathe, a split block having a horizontal hole to receive the lathe tool or adaptor therefor, means to adjust the vertical position of said block with respect to said base, and means to selectively contract the sides of said block upon said tool or expand said sides to release said tool, comprising a manually-rockable shaft fitted into the upper portion of said block, said shaft having three eccentric cams, means to connect the two end cams to the bottom portion of said block, whereby when said shaft is rocked in one direction the sides of said block will be contracted, and means located in said lower block and engageable by said central cam to expand the sides of said block and release the tool mounted therein.

2. In a lathe tool holder, a base for attachment to the compound rest of the lathe, a split block having a horizontal hole to receive the lathe tool or adaptor therefor, means to adjust the vertical position of said block with respect to said base, and means to selectively contract the sides of said block upon said tool or expand said sides to release said tool, comprising a horizontal manually rockable shaft fitted into the upper portion of said block, said shaft having a pair of cams, a link surrounding one of said cams, and means to connect said link to the lower portion of said block, means mounted in said lower portion engageable by said other cam, whereby the rocking of said shaft in one direction will contract said block, and the rocking of said shaft in the other direction will expand said block.

3. In a lathe tool holder, a base for attachment to the compound rest of the lathe, a split block having a horizontal hole to receive the lathe tool or adaptor therefor, means to adjust the vertical position of said block with respect to said base, and means to selectively contract the sides of said block upon said tool or expand said sides to release said tool, comprising a rockable shaft fitted in the upper portion of said block, said shaft having an eccentric cam, a link having a circular aperture near its upper end loosely surrounding said cam, said link having a vertical slot near its lower end, a cross rod located in said slot and mounted in the lower portion of said block, and a set screw in the lower portion of said block for engaging said cross rod to adjust the position of said link.

EDWIN W. PLUMB.

REFERENCES CITED

The following references are of record in the file of this patent:

UNITED STATES PATENTS

| Number | Name | Date |
| --- | --- | --- |
| 70,830 | Gleason | Nov. 12, 1867 |
| 609,767 | Bailey | Aug. 30, 1898 |
| 643,713 | Converse | Feb. 20, 1900 |
| 965,893 | Hanson | Aug. 2, 1910 |
| 1,314,911 | Stephenson | Sept. 2, 1919 |
| 1,454,611 | Adair | May 8, 1923 |
| 2,171,802 | Nielsen | Sept. 5, 1939 |
| 2,345,161 | Thomason | Mar. 28, 1944 |
| 2,361,683 | Greenberg | Oct. 31, 1944 |
| 2,390,148 | Hymans | Dec. 4, 1945 |